United States Patent
Brei et al.

(10) Patent No.: US 11,577,275 B2
(45) Date of Patent: Feb. 14, 2023

(54) CO-CURABLE FILM LAYER APPLICATION

(71) Applicant: The Boeing Company, Chicago, IL (US)

(72) Inventors: Mark R. Brei, Ladson, SC (US); Terrell D. Riley, Summerville, SC (US); Kevin D. Gordon, Summerville, SC (US); Meredith P. Nix, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 674 days.

(21) Appl. No.: 16/551,374

(22) Filed: Aug. 26, 2019

(65) Prior Publication Data

US 2021/0060607 A1    Mar. 4, 2021

(51) Int. Cl.
| | | |
|---|---|---|
| *B05D 7/00* | (2006.01) | |
| *B64C 1/00* | (2006.01) | |
| *B29C 37/00* | (2006.01) | |
| *B29C 70/68* | (2006.01) | |
| *B05D 3/04* | (2006.01) | |
| *B05D 5/06* | (2006.01) | |

(52) U.S. Cl.
CPC ........... *B05D 7/577* (2013.01); *B05D 3/0486* (2013.01); *B05D 5/06* (2013.01); *B05D 7/574* (2013.01); *B29C 37/0028* (2013.01); *B29C 70/68* (2013.01); *B64C 1/00* (2013.01); *B64C 2001/0054* (2013.01)

(58) Field of Classification Search
None
See application file for complete search history.

(56) References Cited

U.S. PATENT DOCUMENTS

| | | |
|---|---|---|
| 8,545,943 B2 | 10/2013 | Frankenberger et al. |
| 9,452,616 B1 | 9/2016 | Mathis et al. |

(Continued)

FOREIGN PATENT DOCUMENTS

| | | |
|---|---|---|
| EP | 0573676 A1 | 12/1993 |
| EP | 2535170 A1 | 12/2012 |

OTHER PUBLICATIONS

Extended European Search Report dated Dec. 8, 2020 in corresponding European Application No. 20183903.2, 12 pages.

(Continued)

*Primary Examiner* — Shamim Ahmed
*Assistant Examiner* — Bradford M Gates
(74) *Attorney, Agent, or Firm* — MH2 Technology Law Group LLP (57) ABSTRACT

The present disclosure is directed to a method for applying a multi-colored coating to a composite structure comprising applying a first co-curable film layer comprising a first color marking to a composite tool, applying a second co-curable film layer comprising a second color marking over the composite tool and at least partially over the first co-curable film layer to create a lay-up of a multi-colored marking, applying a composite structure over the lay-up of the multi-colored marking, and curing the lay-up of the multi-colored marking and the composite structure in a single curing step to create a cured multi-colored coating on the composite structure. A multi-colored coating for marking a composite structure and an aircraft part having a multi-colored marking are also provided.

20 Claims, 4 Drawing Sheets

(56) References Cited

U.S. PATENT DOCUMENTS

| | | |
|---|---|---|
| 2010/0151239 A1 | 6/2010 | Hebert et al. |
| 2014/0154496 A1 | 6/2014 | Sang et al. |
| 2014/0329055 A1 | 11/2014 | Berry et al. |
| 2017/0335129 A1* | 11/2017 | Wang .................. C09D 5/00 |
| 2018/0345646 A1 | 12/2018 | Westren et al. |

OTHER PUBLICATIONS

Chinese First Office Action dated Dec. 2, 2022 in corresponding Chinese Application No. 202010720803.X, 9 pages.

* cited by examiner

CO-CURABLE FILM LAYER APPLICATION

FIELD

The present disclosure is directed to a method for applying multiple colored co-curable film layers to a composite structure. The resulting multi-color coated composite structure may exhibit good color definition as well as protection from exposure to environmental conditions or elements including ultraviolet radiation, moisture and/or chemicals, such as fuels. The present methods for applying multiple colored co-curable film layers to a composite structure are particularly useful for marking aerospace components, such as aircraft components.

BACKGROUND

Many components, for example, vehicle, aerospace (e.g., aircraft and the like), and other components, are constructed of strong but light-weight composite materials that help to minimize the overall weight of the structure, e.g., an aircraft. These composite materials often comprise carbon reinforcement fibers distributed within a polymeric matrix.

Commercial aircraft and vehicle manufacturers often desire to mark or brand the aircraft or vehicles with information or indicia (e.g., model numbers, company names, company logos, or other decorational or informational markings, including words, numbers, lettering, and designs of any sort). Marking, however, has proven challenging with respect to parts made from composite materials. Painting or printing on these composite structures often causes an increase in manufacturing process times, such as paint operation flow time, thus increasing costs and time required to manufacture the part. In some cases, the part may include complex three-dimensional curvature(s), which may be difficult to print on.

Conventional methods of painting an aircraft require multiple steps of masking, painting, and demasking. For applying an aircraft livery with multiple colors, it may be necessary to perform the steps of masking, painting, and demasking for each color in the livery, which may add to the overall amount of time required to paint the aircraft. In addition, the aircraft livery must be applied in a precise manner to avoid gaps that may otherwise expose a typically-white undercoat which may detract from the overall appearance of the aircraft. Furthermore, the process of applying paint to the aircraft surfaces must be carried out with a high level of control to ensure an acceptable level of coating thickness to meet performance requirements, such as weight, electromagnetic effects, aerodynamics, etc.

Further complicating the marking of composite structures may be the need for enhanced durability of the marking, to protect it from environmental conditions, as well as the desire to coat multiple colors or complex indicia on a composite part, as each layer of coating using traditional marking and painting methods may reduce smoothness of the surface of the composite structure.

In addition, maintaining desired flow characteristics over coated or painted aircraft surfaces, for example coated or painted on the wings or tail of an aircraft, may be challenging. In order to avoid impact on desired boundary layer characteristics during flight, there are allowable criteria for paint edges and waviness. There may also exist restrictions for three-dimensional surface discontinuities, such as those that may occur from inclusions caused by debris, dust, or dry coating overspray, as well as from multiple layers of applied paint, for example paint in multiple colors to create a design or distinguish lettering.

Known methods and systems exist for applying multi-color airline designs on exterior surfaces of an aircraft. For example, such known methods and systems may include building up coating or paint layers on either a primer layer or a basecoat field color layer using tape and/or masking techniques. These known methods and systems for applying multi-color airline designs on an exterior surface of an aircraft may make it difficult to meet or maintain aerodynamic performance requirements, such as requirements for coating or paint edge angles or coating or paint edge peaks that help to ensure a preferred aerodynamic performance.

Accordingly, there remains a need for marking processes that reduce processing time and/or expense while providing adequate multi-colored designs and a smooth, aerodynamic surface.

SUMMARY

In one aspect, the present disclosure is directed to methods of applying a multi-colored coating to a composite structure, the method including applying a first co-curable film layer having a first color marking to a composite tool, applying a second co-curable film having a second color marking over the composite tool and at least partially over the first co-curable film layer to create a lay-up of a multi-colored marking, applying a composite structure over the lay-up of the multi-colored marking, and curing the lay-up of the multi-colored marking and the composite to create a cured multi-colored coating on the composite structure.

In some embodiments, the methods disclosed herein further include applying a third co-curable film layer having a third color marking between the first and second co-curable film layers. In some embodiments, the curing step is performed in an autoclave. In certain aspects, the methods disclosed herein do not include painting a composite structure with a primer, and in some aspects, the methods further include applying at least one clearcoat layer over the lay-up of the multi-colored marking. In certain aspects, at least one clearcoat layer is applied over the cured multi-colored coating on the composite surface. In various embodiments of the methods disclosed herein, the co-curable film layers, including the first co-curable film layer, the second co-curable film layer, and optionally the third co-curable film layer, contain at least one of polyurethane, polyimide, polyester, or epoxy upon curing.

In another aspect, the present disclosure is directed to a multi-colored coating for marking a composite structure that includes a first co-curable film layer having a first color marking disposed over a composite structure, and a second co-curable film having a second color marking disposed over the composite structure and at least partially over the first co-curable film layer to create a lay-up of a multi-colored marking, wherein the lay-up of the multi-colored marking has been cured together with the composite structure to create a cured multi-colored coating on the composite structure.

In certain aspects, the multi-colored coating further includes a third co-curable film layer having a third color marking disposed between the first co-curable film layer and the second co-curable film layer, wherein the first co-curable film layer, the second co-curable film layer, the third co-curable film layer, and the composite structure have been cured together to create a cured multi-colored coating on the composite structure.

In certain embodiments, the cured multi-colored coating (having 2-3 layers and absent a composite) has a thickness ranging from about 1 mil (25 microns) to about 4 mils (100 microns). In certain embodiments, the cured multi-colored coating has a thickness that is less than the thickness of a traditionally-applied multi-colored coating. In certain embodiments, the cured multi-colored coating has a coating edge peak height ranging from about 0 mils (0 microns) to about 2 mils (50 microns) between the first co-curable film layer and the second co-curable film layer, and in certain embodiments, the cured multi-colored coating has a coating edge peak height ranging from about 0 mils to about 1 mil (25 microns) between the first co-curable film layer and the third co-curable film layer. In certain embodiments, the cured multi-colored coating has a coating edge peak height ranging from about 0 mils to about 1 mil between the first co-curable film layer and the second co-curable film layer. In certain embodiments, the co-curable film layers contains polyurethane upon curing. In certain embodiments, the multi-colored coating has a weight ranging from about 0.008 pounds per square foot to about 0.05 pounds per square foot.

In yet another embodiment, the present disclosure is directed to an aircraft part having a multi-colored marking thereon that includes a composite structure and the multi-colored coating as disclosed herein cured to the surface of the composite structure.

It should be noted that some details of the figures have been simplified and are drawn to facilitate understanding of the present teachings rather than to maintain strict structural accuracy, detail, and scale.

DETAILED DESCRIPTION

The following description is merely exemplary in nature and is in no way intended to limit the disclosure, its application, or uses.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls. Unless otherwise specified, all percentages and amounts expressed herein and elsewhere in the specification should be understood to refer to percentages by weight. The amounts given are based on the active weight of the material.

Presently disclosed methods for applying a multi-colored coating on a composite structure may improve upon prior art techniques and may improve processing times as compared to prior art techniques. In the methods disclosed herein, multiple colored indicia or markings and the composite structure may be co-cured in one curing operation, as opposed to prior art techniques involving separately marking and curing multiple indicia or otherwise placing indicia on previously cured composite structures. As used herein, "multiple" refers to more than one, including, for example, two, three, four, five, or more, and "multi-colored" refers to multiple colors, such as two colors, three colors, four colors, five colors, or more.

Such presently disclosed methods include the use of a first co-curable film layer comprising a first color marking and a second co-curable film layer comprising a second color marking. The first and second co-curable film layers are placed over a composite tool such that they at least partially overlap, and a composite structure is placed over the first and second co-curable film layers. The first co-curable film layer, the second co-curable film layer, and the composite structure are then co-cured to create a multi-colored coating on the composite structure. In certain embodiments, the method may further comprise the use of at least a third co-curable film layer comprising a third color marking, such as at least a fourth co-curable film layer comprising a fourth color marking and a fifth co-curable film layer comprising a fifth color marking. The co-curable film layers and the composite structure are configured to be co-cured after the co-curable film layers are positioned on the composite structure, with said co-curing occurring, for example, in a curing device (e.g., an autoclave, radiant heat oven, microwave, and the like). The color markings for each co-curable film may be the same or different, provided that at least one co-curable film layer comprises a color marking that is different from at least one other co-curable film layer in the lay-up of the multi-colored marking.

Methods for applying a multi-colored coating on a composite structure are disclosed. Additionally, composite structures including multi-colored indicia or markings coated thereon according to the methods of the present disclosure, and apparatus including such composite structures, are also disclosed.

The methods disclosed herein, in embodiments, may eliminate or reduce the need for additional steps typically used in marking composite structures, such as, for example, sanding, masking, painting, and/or multiple curing steps, while enabling the creation of smooth, colorfast, and lightweight multi-colored indicia or markings on the composite structures.

Further, the multi-color coatings on the composite structures produce by the methods disclosed herein may be resistant to environmental conditions including UV radiation damage and require few steps to manufacture, thus reducing labor costs. The phrase "environmental conditions," as used herein, encompasses conditions or elements in an environment due to nature, e.g., electromagnetic energy events, such as lightning strike, electrostatic discharge, and electromagnetic interference; solar radiation including ultraviolet radiation, ozone, humidity, and rain; and/or conditions and/or elements found in an environment that are not due to nature, such as conditions and/or chemicals, including those in an aircraft environment, e.g., extreme heat produced by aircraft engines that is passed on by conduction and radiation to nearby devices, deicing fluid, fuel, hydraulic fluid, cleaning solutions, etc.

These and other surprising benefits of the present methods for applying a multi-colored coating on a composite structure are further described herein.

Co-Curable Film Layers

The present disclosure is directed to a method for applying a multi-colored coating on a composite structure using at least two co-curable film layers, such as at least three or at least four or more co-curable film layers, wherein each layer comprises a color marking. As described herein, the color marking may be incorporated into a co-curable film layer of the disclosure or may disposed on the surface of a co-curable film layer, for example printed on the co-curable film layer.

In some embodiments, the co-curable film layers of the present disclosure are formed from a co-curable film composition comprising a thermosetting resin. Generally, the thermosetting resin comprises prepolymers in the form of a soft solid or viscous liquid at room temperature (about 20° C. to about 25° C.), which typically hardens after curing.

"Curing" induces chemical reactions in a curable substance, such as a co-curable film composition, resulting in extensive cross-linking between polymer chains to produce an insoluble polymer network. Curing may be performed by processes that include, for example, heating and/or exposure to ultraviolet light. In some embodiments, curing is promoted by high pressure, or mixing with a curing agent or catalyst. The phrase "at least partially cured" as used herein, refers to subjecting a polymerizable composition to curing conditions, wherein reaction of at least a portion of the reactive groups of the composition occurs, to form a solid polymerizate.

Examples of suitable thermosetting resins for use with the co-curable film compositions of the present disclosure include polyester resins, epoxy resins, and polyimide resins, e.g., bismaleimide (BMI) and/or polyetherimides. In more typical embodiments, the thermosetting resins for use with the curable film composition of the present disclosure include at least one polyisocyanate and at least one polyol, which form polyurethane upon curing. The term "polyurethane," as used herein, refers to polymers containing urethane (also known as carbamate) linkages, urea linkages, or combinations thereof, e.g., polyurethane-ureas. Thus, polyurethanes of the disclosure may contain at least urethane linkages and, optionally, urea linkages.

In some embodiments, the co-curable film composition of the present disclosure comprises an amount of thermosetting resin ranging from about 5 to about 100 weight percent (wt. %), such as about 15 to about 75 wt. % or from about 25 to about 60 wt. %, on the basis of the total weight of a co-curable film composition.

In some embodiments, the co-curable film composition of the present disclosure further comprises non-conductive additives, such as fillers, flow control agents, toughening agents, stabilizers (e.g., antioxidants, heat stabilizers, and ultraviolet (UV) stabilizers), curing agents and/or catalysts.

Examples of non-conductive fillers suitable for use with the co-curable film composition of the present disclosure include ground or precipitated chalks, quartz powder, alumina, dolomite, carbon fibers, glass fibers, polymeric fibers, titanium dioxide, fused silica, carbon black, calcium oxide, calcium magnesium carbonates, barite and, especially, silicate-like fillers of the aluminum magnesium calcium silicate type. Other suitable non-conductive fillers include ceramics and fumed silica. The fillers may be in the form of flakes, powders, fibers, microspheres, or glass balloons, and may be solid or hollow structures. Further discussion of fillers may be found, for example, in U.S. Pat. No. 4,980,234, which is herein incorporated by reference in its entirety.

In some embodiments, the fillers may be present in the co-curable film composition of the present disclosure in an amount ranging from about 0 to about 40 wt. %, or from about 5 to about 30 wt. % based on the basis of the total weight of the co-curable film composition.

Flow control agents may be employed to modify the rheological properties of the present co-curable film composition. Examples of suitable flow control agents include fumed silica and metallic powders. The flow control agents may be present in an amount ranging from about 0 to about 40 wt. %, such as from about 0.1 to about 10 wt. %, on the basis of the total weight of the composition.

In some embodiments, toughening agents may be added to the present co-curable film compositions to adjust the film rigidity and surface hardness of the film after curing. In certain embodiments, the toughening agents may be polymeric or oligomeric, have glass transition temperatures below about 20° C. (more typically below about 0° C. or below about −30° C. or below about −50° C.), and/or have functional groups such as carboxylic acid groups, amino groups and/or hydroxyl groups capable of reacting with other components of the present co-curable film composition when the composition is cured by heating.

Examples of suitable toughening agents include elastomeric toughening agents, such as carboxylated nitriles (e.g., Nipol® 1472, Zeon Chemical, Inc.), carboxylterminated butadiene acrylonitrile (CTBN), carboxyl-terminated polybutadiene (CTB), poly(ether ether ketone) (PEEK) and polyetherketoneketone (PEKK). Further examples of suitable toughening agents are found, for example, in U.S. Pat. No. 4,980,234; U.S. Patent Application Publication No. 2008/0188609; and International Patent Publication No. WO 2008/087467, each of which is herein incorporated by reference in its entirety. In certain embodiments, the concentration of the toughening agents may range from about 5 to about 40 wt. % or from about 1 to about 30 wt. % based on the basis of the total weight of the composition. In other embodiments, the concentration of the toughening agent may range from about 1 to about 30 wt. %.

UV stabilizers may also, optionally, be added to the present co-curable film composition. In some embodiments, the UV stabilizers include UV absorbers, antioxidants, pigments, blocking agents, and fillers. In some embodiments, the UV stabilizers include butylated hydroxytoluene (BHT), 2-hydroxy-4-methoxy-benzophenone (UV-9), 2,4-Bis(2,4-dimethylphenyl)-6-(2-hydroxy-4-octyloxyphenyl)-1,3,5-triazine, 3,5-Di-te/t-butyl-4-hydroxybenzoic acid, n hexadecyl ester, titanium dioxide, and carbon black. In some embodiments, the UV stabilizers may each be present in an amount ranging from about 0.1 to about 5 wt. %, or from about 0.5 to about 3 wt. % based on the basis of the total weight of the composition.

Examples of suitable curing agents and/or catalysts, which may be added to a co-curable film composition of the present disclosure include aliphatic and aromatic primary amines, and aliphatic and aromatic tertiary amines. More particularly, amine curing agents and/or catalysts may include dicyandiamide, bisureas (e.g., 2,4-Toluene bis-(dimethyl urea), 4,4'-methylene bis-(phenyl dimethylurea) and 4,4'-diaminodiphenyl sulfone (4,4-DDS). Other suitable curing agents and/or catalysts include boron trifluoride complexes, guanidines, and dicyandiamide. Additional examples of curing agents and/or catalysts may be found, for example, in U.S. Pat. No. 4,980,234 and U.S. Patent Application Publication No. 2008/0188609, each of which is herein incorporated by reference in its entirety.

In certain embodiments, one or more curing agents and/or catalysts may be present in an amount ranging from about 0.1 to about 40 wt. % based on the total weight of the co-curable film composition. In other embodiments, the one or more curing agents and/or catalysts may be present in an amount ranging from about 0.5 to about 10 wt. % based on the total weight of the co-curable film composition.

Other suitable additives that may optionally be included in the co-curable film composition of the present disclosure include, for example, crosslinkers (e.g., aluminum or melamine crosslinkers), binders, corrosion inhibitors, plasticizers and/or other conventional additives known to those of ordinary skill in the art. In some embodiments, electrically conductive materials are also included in the present co-curable film composition as described herein.

The co-curable film composition of the present disclosure may be formed by adding one or more resins capable of forming a thermosetting polymer as described herein to a mixing vessel. In certain embodiments, non-conductive additives, e.g., one or more non-conductive fillers, flow control agents, UV stabilizers, curing agents and/or catalysts are also added to the mixing vessel, as well as, in certain embodiments, one or more electrically conductive materials, such as silver nanoparticles.

In some embodiments, one or more solvents are included in the mixture to promote mixing of the components. Examples of such solvents may include methyl ethyl ketone (MEK), acetone, dimethylacetamide (DMAc), and N-Methylpyrrolidone (NMP).

After adding the above-described components, the co-curable film composition may be allowed to mix using, for example, a high speed shear mixer. Mixing may be performed until the components are mixed substantially uniformly and are dispersed relatively uniformly in the curable film composition, e.g., about 30 to about 80 minutes at a speed ranging from about 1000 to about 5000 rotations per minute, for example.

The mixed co-curable film composition may then subsequently be formed into a co-curable film layer by coating using hot-melt coating or solvated film coating processes, for example, as are known in the art. In some embodiments, the co-curable film layer of the present disclosure may be stored in cold storage in order to inhibit curing, thereby prolonging its useful shelf life.

In some embodiments, the co-curable film layer of the present disclosure ranges in thickness from about 1 mil to about 15 mils (about 25 microns to about 375 microns), such as about 2 mils to about 10 mils (about 50 microns to about 250 microns), such as about 3 mils to about 7 mils (about 150 microns to about 175 microns), or such as about 3 mils to about 4 mils (about 75 microns to about 100 microns), wherein 1 mil is equal to approximately 25 microns.

In some embodiments, at least two co-curable film layers are formed from one or more co-curable film compositions. In such embodiments, the co-curable film layers may each comprise the same or different colorants or colored marking materials printed thereon. In certain embodiments, the co-curable film layers may each comprise the same or different thermosetting resins.

In addition to a thermosetting resin, the co-curable film layers disclosed herein further comprise at least one colorant, such as a pigment or dye therein, or may include a colored marking material printed thereon. In certain embodiments, the at least one colored marking material is printed on the co-curable film layer, and in certain embodiments, the at least one colorant is mixed into the co-curable film composition. Both the colorant (mixed into the co-curable film layer) and the colored marking material (printed on the co-curable film layer) are hereinafter referred to as "color marking." The at least one colorant may be used to adjust the color and appearance of the co-curable film layer. As used herein, "colorant" indicates any substance that imparts a color to the co-curable film layer and may include both colorants (as known in the art) and pigments. Suitable colorants include, for example, titanium dioxide, carbon black, black pigment, and other color dyes and pigments, including both inorganic and organic pigments. The colorant may be provided in the form of flakes, powders, fibers, or color concentrate liquid. Multiple colorants may be added to a single co-curable film. In certain embodiments, the colorant is a solvent-based or aqueous-based colorant. In certain embodiments, the colorant may impart a special effect on the co-curable film layer, such as, for example, enhanced reflectance, pearlescence, or sheen.

Exemplary colorants and pigments include carbon black like REGAL 330® magnetites; Mobay magnetites including MO8029®, MO8060®; Columbian magnetites; MAPICO BLACKS® and surface treated magnetites; Pfizer magnetites including CB4799®, CB5300®, CB5600®, MCX6369®; Bayer magnetites including, BAYFERROX 8600®, 8610®; Northern Pigments magnetites including, NP-604®, NP-608®; Magnox magnetites including TMB-100®, or TMB-104®, HELIOGEN BLUE L6900®, D6840®, D7080®, D7020®, PYLAM PYLAM OIL BLUE®, PYLAM OIL YELLOW®, PIGMENT BLUE 1® available from Paul Uhlich and Company, Inc.; PIGMENT VIOLET 1®, PIGMENT RED 48®, LEMON CHROME YELLOW DCC 1026®, E.D. TOLUIDINE RED® and BON RED C® available from Dominion Color Corporation, Ltd., Toronto, Ontario; NOVAPERM YELLOW FGL®, HOSTAPERM PINK E® from Hoechst; and CINQUASIA MAGENTA® available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido)phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55.

In certain embodiments, a colored marking material is printed onto the surface of the co-curable film layer. In embodiments where the colored marking material is printed onto the surface of the co-curable film layer, the colored marking material may be printed in the shape of any indicia or marking that is desired for the multi-colored coating on the composite structure. For example, the text, shapes, lines, logos, or any decorational or informational marking may be printed on the surface of the co-curable film layer.

The co-curable film layer includes a first film surface and a second film surface opposite the first film surface. A printer may be configured to print the desired indicia on the first film surface, and the co-curable film layer is configured to be positioned on a composite structure after the indicia is printed thereon. In some examples, the co-curable film layer is configured to be positioned on the composite structure such that the second film surface faces the composite structure. In other embodiments, the co-curable film layer may be configured to be positioned on the composite structure such that the first film surface faces the composite structure.

The printer for printing a colored marking material on a co-curable film layer may be an industrial printer, an inkjet printer, a piezoelectric drop-on-demand printer, and/or any suitable printer or other device configured to place the colored marking material on the co-curable film layer. In some embodiments, the printer is an inkjet printer with one or more inkjet printing heads.

The colored marking material used for printing on the co-curable film layer may be any suitable type of ink, paint or other colored marking material as defined herein. For example, in certain embodiments the colored marking material is an ink selected from toners and inks (liquid or solid) and include laser jet toner, wax-based inks, UV-curable inks, and/or solvent-based inks. In certain embodiments, the colored marking material is a solvent-based ink or a UV-curable ink, and in certain embodiments, the colored marking material is a solvent-based ink. Suitable inks may be obtained, for example, from Toyo Ink America, LLC or from SunChemical Company.

In some embodiments, the co-curable film layer is an in-mold co-curable film layer that is configured to be placed in a mold or composite tool with the composite structure during curing. The co-curable film layer may, in certain embodiments, be adhesive backed. The co-curable film layer may be a thin film and may be pliable enough to conform to the contours of the composite structure as the co-curable film layer is applied to the composite structure. In some embodiments, the co-curable film layer may further comprise a scrim material to improve handleability.

During printing, the co-curable film layer may be secured in place to retain the co-curable film layer in a substantially flat configuration. For example, the co-curable film layer may be secured in place to prevent wrinkling of the co-curable film layer during printing or moving of the co-curable film layer while the indicia is being printed on a first film surface. Printing on a co-curable film layer in a flat configuration may be advantageous over prior art techniques of printing or painting directly on the composite structure. For example, in embodiments wherein the composite structure is complexly-shaped (e.g., having three-dimensional curved surfaces), printing directly on the complex shapes and surfaces may be difficult and expensive, whereas printing directly onto a substantially flat co-curable film layer and then applying the co-curable film layer to the composite structure after printing may allow for improved printing resolution with cheaper and less complicated printers.

Composite Structures

In some embodiments, the composite structures are formed from an organic matrix and fibers, such as an epoxy resin and Carbon Fiber Reinforced Plastic (CFRP). In some embodiments, the composite structure is in the form of a prepreg. The term "prepreg," as used herein, refers to one or more sheets or lamina of fibers that have been impregnated with a matrix material. The matrix may be present in a partially cured state to exhibit a selected stickiness or tack, for example.

In some embodiments, the prepreg layers are placed adjacent to one another. In certain embodiments, the prepreg layers within a layup may be positioned in a selected orientation with respect to one another. For example, prepreg layups may comprise prepreg layers having unidirectional fiber architectures, with the fibers oriented at 0°, 90°, a selected angle θ, and combinations thereof, with respect to the largest dimension of the layup, such as the length. It may be further understood that, in certain embodiments, prepregs having any combination of fiber architectures, such as unidirectional and multi-dimensional, may be combined to form the prepreg layup.

In some embodiments, the composite structures are formed from one or more sandwich panels (e.g., honeycomb panels), one or more of which may be composite panels. Each sandwich panel generally includes a core formed of a relatively lightweight material, sandwiched between two panel skins. Composite structures may include one or more coatings or layers applied to the underlying panels or layers of material. Composite structures may include one or more sandwich panels, joints formed between two or more sandwich panels, and/or three-dimensional structures formed using one or more sandwich panels.

As illustrative, non-exclusive examples, composite structures may be utilized in such aircraft structures as wings, fuselages, horizontal stabilizers, vertical stabilizers, and engine housings; however, other components of an aircraft additionally or alternatively may include composite structures such as sandwich panels and/or joints formed between two or more sandwich panels. Other applications in aircraft for composite structures include overhead storage bins, floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, one or more composite structures may include or be a portion of space satellites or aerospace vehicles, transit vehicles, shipping containers, shelters, large antennae or disk reflectors, refrigeration panels, rapid transit floor panels, shipboard electronic deck shelters, cargo pallets, automobile bodies, boats and other marine vehicles, architectural curtain walls, partitions, divider panels, expandable hospital shelters, and/or interior structures of an assembly.

In some embodiments, the composite structure and the co-curable film layers are positioned together and co-cured in a mold. The co-curing typically results in the incorporation of the co-curable film layers onto the composite material. In some embodiments, the co-curing comprises baking the co-curable film layers and the composite structure at a temperature ranging from about 121° C. to about 200° C., such as from about 121° C. to about 130° C.

In some embodiments, co-curing is accomplished by the use of an autoclave, oven curing, such as microwave curing, or out of the autoclave curing. "Out of the autoclave," as used herein, is a process whereby a prepreg layup including, for example, co-curable film layers of the present disclosure is within a closed mold. Vacuum, pressure, and heat are then applied using art-known means other than an autoclave, e.g., a resin transfer molding press.

Multi-Colored Coating

In embodiments of the methods disclosed herein for applying a multi-colored coating to a composite structure, the co-curable film layers may be disposed on a composite curing tool to create a lay-up of the multi-colored coating. The lay-up of co-curable film layers, when cured together with the composite structure, results in a multi-colored coating on the composite structure.

In some embodiments, the cured multi-colored coating of the present disclosure having more than about 2 layers, or from about 2 to about 8 layers or from about 2 to about 6 layers or from about 2 to about 4 layers ranges in thickness from about 2 mil to about 60 mils, such as about 4 mils to about 45 mils, such as about 6 mils to about 30 mils, such as about 2 mils to about 6 mils, absent the composite. In certain embodiments, the multi-colored coating is about two times, such as about three times, about four times, or about five times the thickness of each individual co-curable film layer, absent the composite.

Traditional methods of applying multi-colored coatings to composite surfaces such as an aircraft involve sanding, priming, and applying a basecoat, followed by masking and painting each different color of the marking separately, resulting in multiple layers of paint or coating. Not only do the multiple layers of coating increase the thickness and weight of the overall marking and composite surface, but each additional layer that does not completely overlap the previous layer may result in a coating edge peak between the layer's perimeter and the previous layer's surface. Coating edge peaks are known to increase drag and reduce aerodynamic efficiency of the composite surface. A coating edge peak height may be measured using known cross-section photography and known mechanical, optical or laser profilometer procedures. As used herein, "coating edge peak height" means the difference between the measurement of the lowest point of a coating edge and a measurement of the highest point of a coating edge.

In certain embodiments, the methods disclosed herein for applying a multi-colored coating to a composite surface reduce a coating edge peak height. In certain embodiments, the coating edge peak height of the cured multi-colored coating on the composite structure may be about 0 mils, such as ranging from about 0 mils to about 1 mil or from about 0.01 mils to about 1 mil. In certain embodiments, the coating edge peak height of the cured multi-colored coating is less than the coating edge peak height of a multi-colored coating that was applied using traditional methods of masking and painting for each color on the composite structure. For example, in certain embodiments, the coating edge peak height of the cured multi-colored coating on the composite structure may be about 20 mil less than the coating edge peak height of a multi-colored coating on a composite structure that was applied using traditional methods of masking and painting for each color, such as, for example, about 15 mil, about 10 mil, about 5 mil, about 2 mil, or about 1 mil less than the coating edge peak height of a multi-colored coating on a composite structure that was applied using traditional methods of masking and painting for each color.

The cured multi-colored coating provides sufficient colorfastness and resistance to fading, for example fading due to exposure to environmental conditions. In certain embodiments, a composite structure comprising a cured multi-colored coating as disclosed herein also provides a reduced weight, for example as compared to a composite structure comprising traditional layers of paint applied by masking and painting each layer, including a primer layer. For example, a weight savings ranging from about 0 pounds to about 500 pounds, such as from about 50 pounds to about 300 pounds or from about 100 pounds to about 200 pounds per aircraft, may be achieved as compared to multi-colored coatings prepared by traditional marking processes that comprise multiple layers for each color. In certain embodiments, the weight of the composite structure comprising a multi-colored coating as disclosed herein is less than the weight of the same composite structure comprising traditionally-applied multi-colored paint coating, including a primer layer. In some embodiments, the multi-colored coating does not comprise finish layers, e.g., primers and/or a topcoat, thus achieving weight savings. More particularly, in certain embodiments, the weight of the multi-colored coating may range from about 0.008 pounds per square foot to about 0.05 pounds per square foot, such as from about 0.01 pounds per square foot to about 0.04 pounds per square foot or about 0.02 pounds per square foot to about 0.03 pounds per square foot.

Figure 1A:
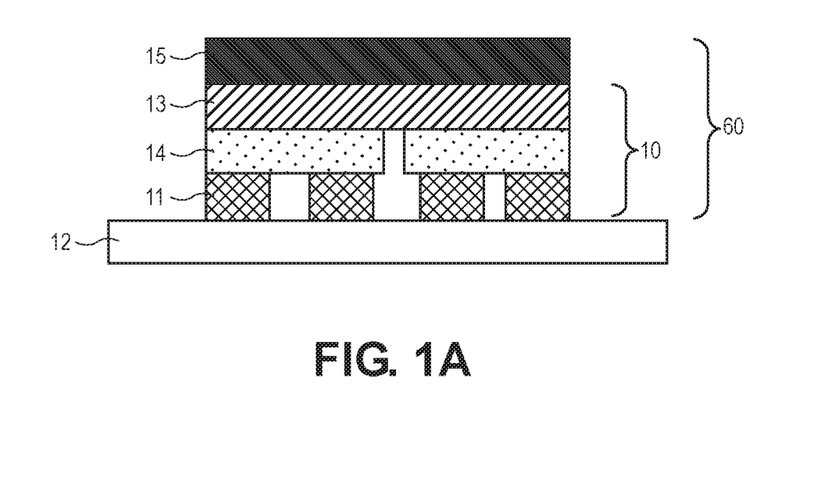
FIG. 1A is a schematic representation of a lay-up of a multi-colored marking as described in the detailed description.
Figure 1B:
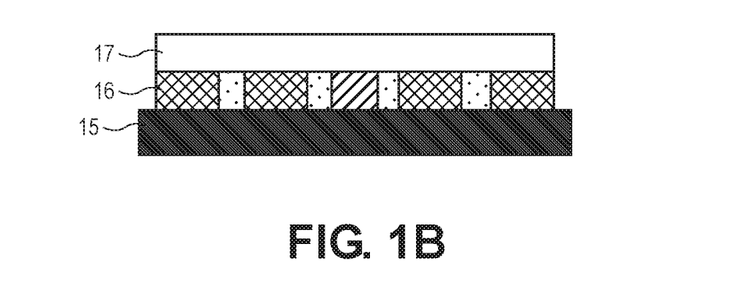
FIG. 1B is a schematic representation of a cured multi-colored coating on a composite structure as described in the detailed description.

An embodiment of a lay-up of co-curable film layers on a composite structure as described herein is depicted in FIG. 1A. The lay-up of multi-colored marking 10 includes a first co-curable film layer comprising a first color marking 11, and a second co-curable film layer comprising a second color marking 13 disposed on a composite curing tool 12. As depicted in the figure, an optional third co-curable film layer comprising a third color marking 14 is sandwiched between the first and second co-curable film layers 11 and 13. Once the lay-up of the multi-colored marking 10 is complete, wherein each co-curable film layer is properly positioned on top of the composite curing tool 12 and/or onto a previously-disposed co-curable film layer, a composite structure 15 may be placed on top of the lay-up of the multi-colored marking 10 to create an uncured multi-color coating on a composite structure 60. The uncured multi-color coating on a composite structure 60 that comprises the lay-up of a multi-colored marking 10 and the composite structure 15 may subsequently be cured to create a composite structure 15 having thereon a cured multi-colored coating 16 with the desired markings, as shown in FIG. 1B. Optionally, a clear coating 17 may be disposed over the cured multi-colored coating 16, as described herein.

In some embodiments, the cured multi-colored coating 16 depicted in FIG. 1B, may mitigate the effects of environmental conditions, such as chemicals or solar radiation, e.g., ultraviolet (UV) radiation. For example, in the absence of cured multi-colored coating, a surface of a composite structure exposed to environmental conditions may be exposed to, e.g., chemicals in the environment, such as hydraulic fluid or jet fuel, which may result in degradation of the composite structure. In some embodiments, the present cured multi-colored coatings are resistant to such chemicals. For example, in some embodiments, degradation of the composite structure comprising the cured multi-colored coating of the present disclosure is decreased, in comparison to the degradation of a composite structure in the absence of the present cured multi-colored coating.

Further, a composite structure may degrade due to exposure to solar radiation, such as UV radiation. However, in some embodiments, a composite structure comprising the cured multi-colored coating of the present disclosure has a UV resistance ranging, for example, from about 200 nanometers to about 800 nanometers, such as from about 200 nanometers to about 400 nanometers.

In other embodiments, the cured multi-colored coating demonstrates a resistance to chemicals such as hydraulic jet fuel, which may result in a softening of conventional paint layers, subsequently resulting in degradation of the composite structure, for example. In contrast, in some embodiments, the cured multi-colored coating of the present disclosure may be resistant to softening after at least thirty days of exposure, such as at least two months of exposure, such as at least six months or more of exposure to about one year.

Moreover, in some embodiments, the reduction and degradation may be accomplished without the need for finish, e.g., primer and topcoat layers. As is known in the art, a primer, which is the foundation of a finish, may be bound to the composite structure to promote adhesion of the topcoat. As is also known in the art, a topcoat finish may be further applied to a composite structure, including a composite structure that has been painted or marked, to further protect exposed surfaces from degradation. However, use of the present cured multi-colored coating, which can mitigate such deterioration, may enable such additional coatings to be avoided, not only lowering labor costs, but also decreasing the weight of a resultant composite structure.

In some embodiments, the co-curable film layers are positioned on the composite structure by manual or automated mechanisms (e.g., automatic tape layup (ATL), automatic fiber placement (AFP)).

Methods of Applying a Multi-Colored Coating to a Composite Structure

Although the methods of the present disclosure are described in the context of images on an aircraft, the methods may be implemented for images on any type of surface, without limitation. In this regard, the surface may be a surface of a motor vehicle including a tractor-trailer, a building, a banner, or any other type of movable or non-movable structure, object, article, or material having a surface upon which an image is to be placed. The surface may be planar, simply curved, and/or complexly curved.

In another aspect, the present disclosure is directed to a method of forming a multi-colored coating on a composite structure. In some embodiments, the co-curable film layers, as described herein, are positioned onto a surface of a composite structure as also herein described. In some embodiments, the co-curable film layers are positioned on a composite curing tool, and a composite structure is then positioned over the lay-up of co-curable film layers. After the co-curable film layers and the composite structure having been positioned, the co-curable film layers and the surface of the composite structure may be co-cured, as described, to form a cured multi-colored coating on a composite structure.

Figure 2A:
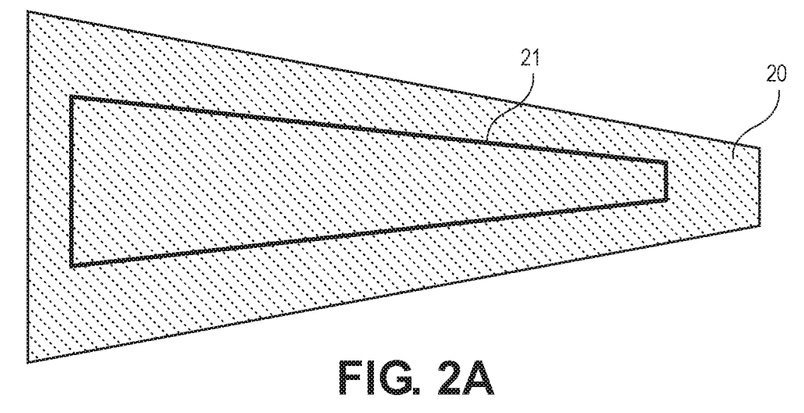
FIG. 2A is a schematic representation of a composite tool with a first co-curable film layer applied thereon, as described in the detailed description.

In embodiments disclosed herein, for example as depicted in FIG. 2A, a first co-curable film layer 21 comprising a first color marking is positioned on a composite curing tool 20. The first co-curable film layer 21 may be in any desired shape or pattern, including text, numbers, shapes, lines, arrows, logos, livery markings, etc. In some embodiments, the first co-curable film layer 21 may be one continuous piece or multiple pieces, e.g., two or more pieces. In embodiments where the first co-curable film layer 21 comprises multiple pieces, the multiple pieces may optionally overlap.

Figure 2B:
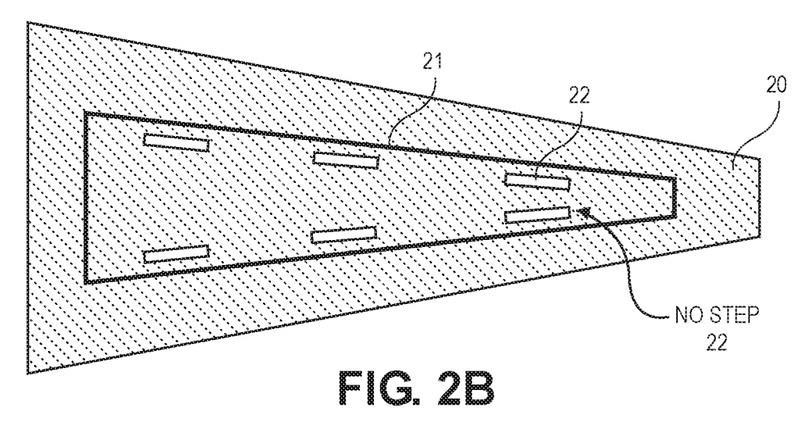
FIG. 2B is a schematic representation of a composite tool with first and second co-curable film layers applied thereon as described in the detailed description.
Figure 2C:
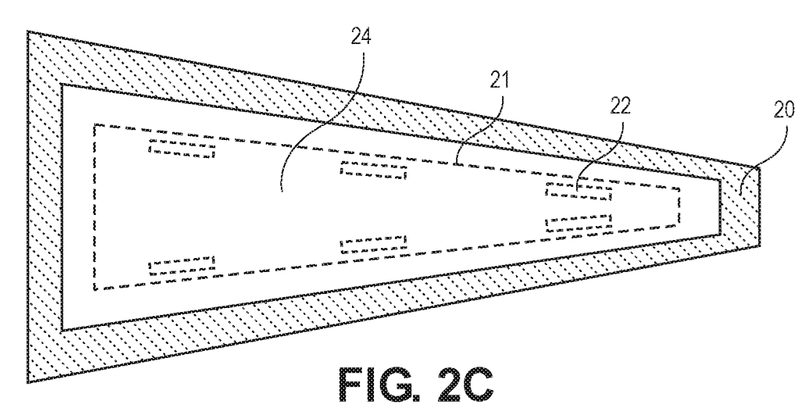
FIG. 2C is a schematic representation of a composite tool with first, second, and third co-curable film layers applied thereon as described in the detailed description.

In some embodiments, a second co-curable film layer 24 comprising a second color marking is positioned over the composite curing tool 20, as shown in FIG. 2C. In certain embodiments, the second co-curable film layer 24 may overlap the first co-curable film layer 21 (depicted as a dotted line in FIG. 2C) entirely or partially, and in certain embodiments, the second co-curable film layer 24 does not overlap the first co-curable film layer 21. In certain embodiments, the first color marking is different from the second color marking. In certain embodiments, the second co-curable film layer 21 comprising a second color marking is a white co-curable film layer, and in certain embodiments, the second co-curable film layer 21 is a field color of the desired multi-color coating on the composite structure 20, such as a white field color.

In some embodiments, such as depicted in FIG. 2B, at least a third co-curable film layer 22 comprising a third color marking is positioned over the composite tool 20. The third color marking may be the same or different from the first color marking, and the third color marking may be the same or different from the second color marking. In certain embodiments, the third color marking may be different from both the first and second color marking. In certain embodiments, the third co-curable film layer 22 comprising a third color marking is positioned over the composite tool 20. In certain embodiments the third co-curable film layer 22 may overlap the first co-curable film layer 21 and/or the second co-curable film layer 24 entirely or partially, and in certain embodiments, the third co-curable film layer 22 does not overlap the first co-curable film layer 21 and/or the second co-curable film layer 24.

In other embodiments, additional co-curable film layers, such as a fourth, fifth, or sixth co-curable film layer comprising a fourth, fifth, or sixth color marking, respectively, may be positioned over the composite curing tool. The additional co-curable film layers may comprise a color marking that is the same or different from the previous color markings used on any of the previous co-curable film layers, such as the first, second, or third co-curable film layers. In certain embodiments, the additional co-curable film layer is positioned over the composite curing tool. In certain embodiments the additional co-curable film layer may overlap at least one previous co-curable film layer, such as the first, second, or third co-curable film layers, entirely or partially. In certain embodiments, the additional co-curable film layer does not overlap the previous co-curable film layers. According to the present disclosure, there is no theoretical upper limit to the number of co-curable film layers that may comprise the lay-up of the multi-colored marking, the number being restricted only by the size of the composite curing tool, the size of the composite structure, and the desired thickness and weight of the resulting cured multi-colored coating.

Figure 2D:
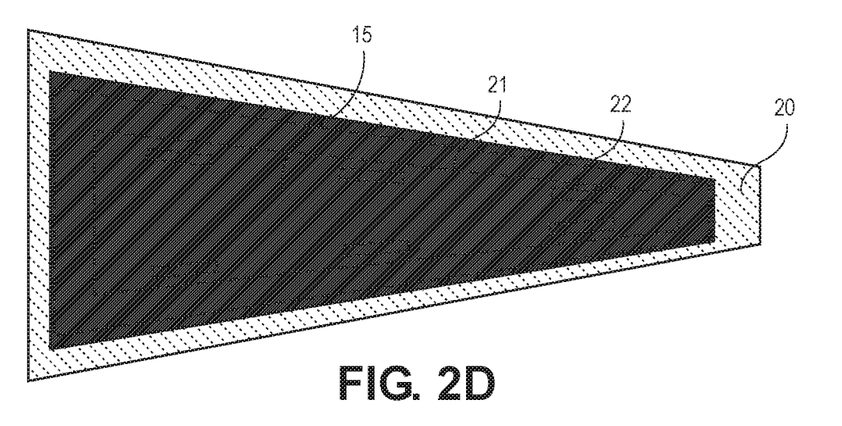
FIG. 2D is a schematic representation of a composite tool with first, second, and third co-curable film layers applied thereon to create a lay-up of a multi-colored marking, as well as a composite wing structure applied over the lay-up as described in the detailed description.

After all of the co-curable film layers, such as the first co-curable film layer 21, the second co-curable film layer 24, and optionally the third co-curable film layer 22, have been desirably positioned on the composite tool 20 to create a lay-up of co-curable film layers 10, a composite structure 15 may be positioned on top of the co-curable film layers 10, as shown in FIG. 2D.

Figure 2E:
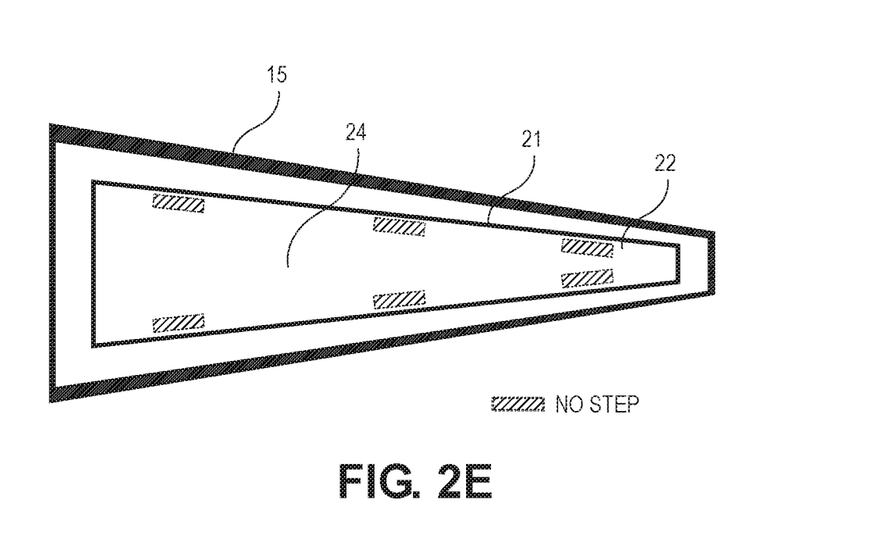
FIG. 2E is a schematic representation of a composite wing structure with a cured multi-colored coating thereon, as described in the detailed description.

After the composite structure 15 is positioned on top of the lay-up of co-curable film layers, the composite structure and the lay-up of co-curable film layers may be cured in a single curing step. In some embodiments, the co-curing comprises baking the lay-up of the multi-colored marking and the composite structure at a temperature ranging from about 121° C. to about 200° C. as described herein. Typically, the co-curing comprises autoclaving the lay-up of co-curable film layers and the composite structure. In other embodiments, co-curing is performed using an oven, such as an out-of-the-autoclave process as described in the present disclosure. After curing, the composite structure 15 comprising thereon a cured multi-colored coating may be removed from the composite tool 20. As shown in FIG. 2E, after curing, the composite structure 15 comprises a cured multi-colored coating which is fabricated by curing the first co-curable film layer 21 together with the second co-curable film layer 24 and the optional third co-curable film layer 22.

Figure 3:
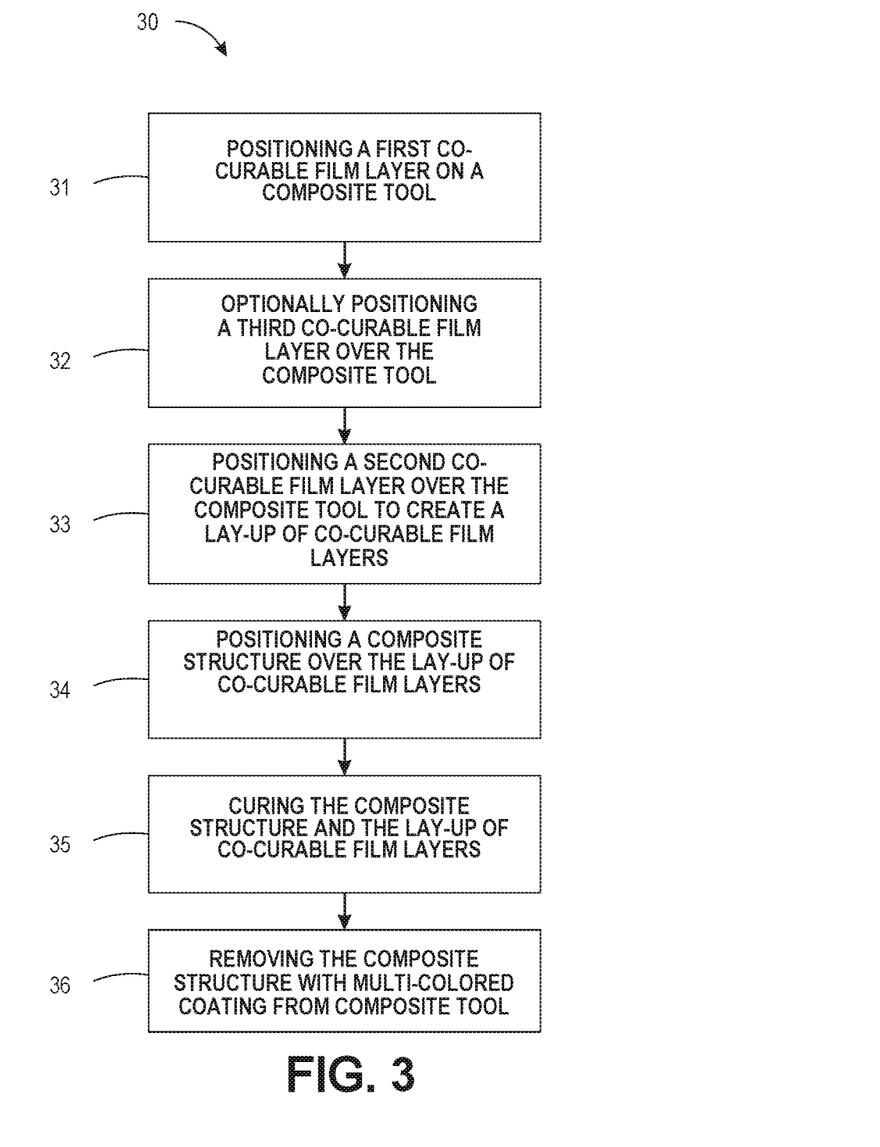
FIG. 3 is a flow chart of a process in accordance with an implementation of the present disclosure.

FIG. 3 depicts a method 30 for applying a multi-colored coating to a composite structure. The method 30 may proceed by operation or use of one or more of the structures depicted in FIGS. 1A, 1B, and 2A-2E described above, and thus is described with reference to these figures; however, it will be appreciated that the method 30 is not limited to any particular structure or use unless expressly stated herein. The method 30 may be performed before, during, or after other processes, and it will be appreciated that the method is described as a series of acts or events, although the present teachings are not limited by the ordering of such acts or events. Some acts may occur in different orders and/or concurrently with other acts or events apart from those described herein. Further, a method in accordance with the present teachings may include other acts or events that have not been depicted for simplicity, while one or more depicted acts or events may be removed or modified.

As shown in FIG. 3, at 31, a first co-curable film layer 21 is positioned over a composite curing tool 20. The method 30 further includes an optional step 32 of positioning a third co-curable film layer 22 over the composite curing tool 20, and a step 33 of positioning a second co-curable film layer 24 over the composite curing tool 20, to create a lay-up 10 of at least two co-curable film layers. At 34, a composite structure 15 is positioned over the lay-up 10 of co-curable film layers 21, 24, and optionally 22. At 35, the composite structure 15 and the lay-up 10 of co-curable film layers 21, 24, and optionally 22 are cured in a single curing step. At 36, the composite structure 15 having a multi-colored coating cured thereon is removed from the composite curing tool 20.

In certain embodiments known in the art, a primer is applied to the surface of a composite structure before a paint layer or coating is applied. The primer may comprise an epoxy primer such as a water-reducible epoxy primer, a solvent-based epoxy primer, or another suitable primer. The primer layer may be applied to an average dry film thickness (dft) from at least about 0.3 mil dft (about 8 microns), or may range, for example, from about 0.3 mil to about 1.0 mil dft (about 8 microns to about 25 microns). If a detail primer and an assembly primer are applied to the surface of the composite structure, each of the detail primer layer and the assembly primer later may be applied to an average dft from at least about 0.3 mil dft, such as from a range of from about 0.3 mil to about 1.0 mil dft. In certain embodiments disclosed herein, no primer is applied to the surface of the composite structure, and the co-curable film layers are deposited directly onto an unprimed surface of a composite structure, or an unprimed surface of a composite structure is deposited directly on to a co-curable film layer. Accordingly, in certain embodiments, the composite structure comprises a multi-colored coating that does not contain a primer layer.

In certain embodiments, the methods disclosed herein may further comprise applying and curing a basecoat field color on the composite substrate. In certain embodiments, the basecoat field color is applied over the entire surface of the composite structure, and in certain embodiments, the basecoat field color is applied over a portion of the surface of the composite structure. The basecoat field color may in certain embodiments comprise a white color paint or another suitable color paint. In certain embodiments, the basecoat field color layer may be applied to an average dry film thickness (dft) ranging from about 1 mil to about 3 mils dft (about 25 microns to about 76 microns). In certain embodiments, no basecoat field color is applied to the surface of the composite structure, and in certain embodiments, a second co-curable film layer may be over the first co-curable film layer and any additional co-curable layers to create a background field color and covers the desired portion of the composite structure, including covering all or substantially all of the composite structure.

The method may optionally further comprise a step of applying and curing a clearcoat over the cured multi-colored coating. In certain embodiments, the clearcoat layer may be applied to an average dry film thickness (dft) from at least about 1 mil dft (about 25 microns), such as applied to an average dft ranging from about 1 mil to about 3 mils ft (about 25 microns to about 70 microns). In certain embodiments, at least one additional clearcoat layer may be applied over a first clearcoat layer. The one or more clearcoat layers may be applied in a sufficient thickness to restore or enhance gloss of the coating or paint. The one or more clearcoat layers may have a thickness, for example, of at least about 1 mil (about 25 microns), such as a range of from about 2 mils to about 25 mils (about 51 microns to about 635 microns).

The co-curing technique disclosed herein may involve co-curing uncured or partially cured components, such as a composite structure and at least two co-curable film layers, that are held in alignment with each other with the aid of a composite tool. The assembled components and the composite tool may be vacuum bagged and then cured together though the application of elevated temperatures and pressures, for example within an autoclave.

We claim:

1. A method for applying a multi-colored coating to a composite structure, the method comprising:
   applying a first co-curable film layer comprising a first color marking to a composite tool;
   applying a second co-curable film layer comprising a second color marking over the composite tool and at least partially over the first co-curable film layer to create a lay-up of a multi-colored marking;
   applying a composite structure over the lay-up of the multi-colored marking; and
   curing the lay-up of the multi-colored marking and the composite structure in a single curing step to create a cured multi-colored coating on the composite structure,
   wherein the cured multi-colored coating has a coating edge peak height ranging from about 0 mils to about 1 mil between the first co-curable film layer and the second co-curable film layer, and wherein the method does not further comprise sanding the cured multi-colored coating.

2. The method of claim 1, further comprising applying a third co-curable film layer comprising a third color marking between the first and second co-curable film layers.

3. The method of claim 1, wherein the curing step is performed in an autoclave.

4. The method of claim 1, wherein the method does not comprise painting the composite structure with a primer.

5. The method of claim 1, further comprising applying at least one clearcoat layer over the lay-up of the multi-colored marking.

6. The method of claim 1, further comprising applying at least one clearcoat layer over the cured multi-colored coating on the composite structure.

7. The method of claim 1, wherein the first and second co-curable film layers comprise at least one of polyurethane, polyimide, polyester, or epoxy upon curing.

8. The method of claim 1, wherein the first and second co-curable film layers comprise polyurethane after curing.

9. The method of claim 1, wherein the cured multi-colored coating has a thickness ranging from about 1 mil to about 15 mils.

10. The method of claim 2, wherein the cured multi-colored coating has a coating edge peak height ranging from about 0 mils to about 1 mils between the first co-curable film layer and the third co-curable film layer.

11. The method of claim 1, wherein the cured multi-colored coating has a weight ranging from about 0.008 pounds per square foot to about 0.05 pounds per square foot.

12. A multi-colored coating for marking a composite structure comprising:
a first co-curable film layer comprising a first color marking disposed over a composite structure, and
a second co-curable film layer comprising a second color marking disposed over the composite structure and at least partially over the first co-curable film layer to create a lay-up of a multi-colored marking,
wherein the lay-up of the multi-colored marking has been cured in a single curing step together with the composite structure to create a cured multi-colored coating on the composite structure,
wherein the cured multi-colored coating has a coating edge peak height ranging from about 0 mils to about 1 mil between the first co-curable film layer and the second co-curable film layer, and wherein the cured multi-colored coating is not sanded.

13. The multi-colored coating of claim 12, wherein the multi-colored coating absent the composite structure has a thickness ranging from about 1 mil to about 15 mils.

14. The multi-colored coating of claim 12, wherein the multi-colored coating does not comprise a primer coating.

15. The multi-colored coating of claim 12, having a weight ranging from about 0.008 pounds per square foot to about 0.05 pounds per square foot.

16. The multi-colored coating of claim 12, further comprising a third co-curable film layer comprising a third color marking disposed between the first co-curable film layer and the second co-curable film layer,
wherein the first co-curable film layer, the second co-curable film layer, the third co-curable film layer, and the composite structure have been cured to create a cured multi-colored coating on the composite structure.

17. The multi-colored coating of claim 16, having a coating edge peak height ranging from about 0 mils to about 1 mil between the first co-curable film layer and the third co-curable film layer.

18. An aircraft part having a multi-colored marking thereon comprising:
a composite structure; and
the multi-colored coating of claim 12 cured to a surface of the composite structure.

19. A method for applying a multi-colored coating to a composite structure, the method comprising:
applying a first co-curable film layer comprising a first color marking to a composite tool;
applying a second co-curable film layer comprising a second color marking over the composite tool and at least partially over the first co-curable film layer to create a lay-up of a multi-colored marking;
applying a composite structure over the lay-up of the multi-colored marking; and
curing the lay-up of the multi-colored marking and the composite structure in a single curing step to create a cured multi-colored coating on the composite structure,
wherein the cured multi-colored coating has a coating edge peak height ranging from about 0 mils to about 1 mil between the first co-curable film layer and the second co-curable film layer,
wherein the method does not further comprise sanding the cured multi-colored coating, and
wherein the first and second co-curable film layers comprise at least one of polyurethane, polyimide, polyester, or epoxy upon curing.

20. The method according to claim 19, wherein the first and second co-curable film layers comprise polyurethane after curing.

* * * * *